United States Patent [19]
Dietzsch

[11] 3,933,339
[45] Jan. 20, 1976

[54] WATER FAUCET WITH SLIDER

[75] Inventor: Kurt Dietzsch, Leonberg-Eltingen, Germany

[73] Assignee: Suddeutsche Kuhlerfabrik, Julius Fr. Behr, Stuttgart, Germany

[22] Filed: May 20, 1975

[21] Appl. No.: 579,133

Related U.S. Application Data

[63] Continuation of Ser. No. 413,353, Nov. 6, 1973, abandoned.

[30] Foreign Application Priority Data

Nov. 11, 1972 Germany............................ 2255278

[52] U.S. Cl. .................. 251/176; 251/205; 251/86
[51] Int. Cl.² ................ F16K 31/165; F16K 25/00
[58] Field of Search ............ 251/86, 186, 176, 203, 251/205, 193, 264

[56] References Cited

UNITED STATES PATENTS

| 907,851 | 12/1908 | Munson | 251/205 |
| 2,613,055 | 10/1952 | Slapnicher | 251/264 |
| 3,333,814 | 8/1967 | Sargent | 251/303 |

FOREIGN PATENTS OR APPLICATIONS

| 26,985 | 12/1908 | United Kingdom | 251/176 |
| 794,753 | 12/1935 | France | 251/176 |

*Primary Examiner*—Henry T. Klinksiek
*Attorney, Agent, or Firm*—Browdy and Neimark

[57] ABSTRACT

A water valve comprises a housing in which a spring biased slider moves between a sealing wall and a sliding wall normal to the liquid flow direction, the spring contacting the sliding wall of the housing.

9 Claims, 4 Drawing Figures

WATER FAUCET WITH SLIDER

This is a continuation, of application Ser. No. 413,353, filed Nov. 6, 1973.

FIELD OF THE INVENTION

The invention relates to a water faucet or water cock or valve with a sliding part transversely movable to the flow path in a housing.

BACKGROUND

Slider-watercocks using flat components as gating or blocking components are known. In one of these known water faucets, a slider plate is pivotably mounted on as axis parallel to the direction of flow. The flow orifice will vary with rotation of this plate and in relation to the contour of the slider. The drawback of such a faucet consists in the requirement of rotation for adjustment of the flow cross-section.

Furthermore, water faucets with simple sliders are also known; however, they are not readily suited to control the flow rate of a warm or hot liquid. Accordingly, prior watercocks with sliders have not been entirely satisfactory.

SUMMARY

It is an object of the present invention to overcome the defects of the prior art including those indicated above. The invention addresses the task of creating a water faucet with a slider part moving transversely to the liquid flow path, which slider may be actuated with as little effort as possible, the faucet insuring at most only minimal as well as complete housing impermeability.

The invention solves the problems of prior water faucets essentially in that the slider is of rectangular design and capable of translation, and in that it is connected to an actuation rod penetrating the housing through a tight insert opening. In order to ensure slider tightness even in the presence of impurities in the liquid being transmitted, the slider is appropriately provided with an approximately oval toroid at its sealing surface.

The slider is suitably spring-loaded approximately at the center of mass of its sealing surface. The spring is preferably an elastic component with four spring legs. Advantageously the elastic component is provided with two apertures, and the slider with two pins or studs upon which the elastic components are seated. The spring component therefore is not rigidly connected with the slider, though it is protected from rotating and tilting by means of the two pins. The sealing surface inside the housing is normal to the direction of flow, while the sliding surface for the spring legs is oblique thereto; such an arrangement allows especially simple injection molding manufacture of the housing.

The actuation rod and the slider advantageously are connected by a universal joint. The slider is then easily driven in the direction of control while being free to swing in the direction of flow; it is pressed against the sealing surface only by the spring component. It is of further advantage in this respect that the connection between actuation rod and slider be located above the plane of latter, in particular outside the longitudinal center of the slider and in the vicinity of its sealing surface.

It is of especial advantage that both housing and slider consist of plastic, and of different kinds, the plastic of the housing material being preferably heat resistant and thermally dimensionally stable, while the plastic material of the slider being elastically deformable upon heating. The slider sealing surface therefore better hugs the housing sealing surface.

In a further development of the invention, the housing is provided with a flange for mounting a vacuum box or the like for displacing the actuation rod by the utilization of reduced or partial pressure. In a variation from activation by means of a partial vacuum setting box, actuation may also be achieved by means of a Bowden, conduit-housed cable. The slider then will be appropriately provided with a wedge-like regulation slit, such slit being located at the actuation side of the slider approximately one quarter of the width from the lengthwise edge. Essentially the regulation slit is parallel to the slider lengthwise edge. The length of the control slit is advantageously one third of the slider length. The regulation slit is also of advantage when the actuation occurs by means of a partial vacuum setting box with modulated partial vacuum.

BRIEF DESCRIPTION OF DRAWING

Further advantages and characteristics of the invention will be explained in greater detail by means of the attached drawing illustrating an embodiment in schematic form.

DETAILED DESCRIPTION OF EMBODIMENT

Figure 1:
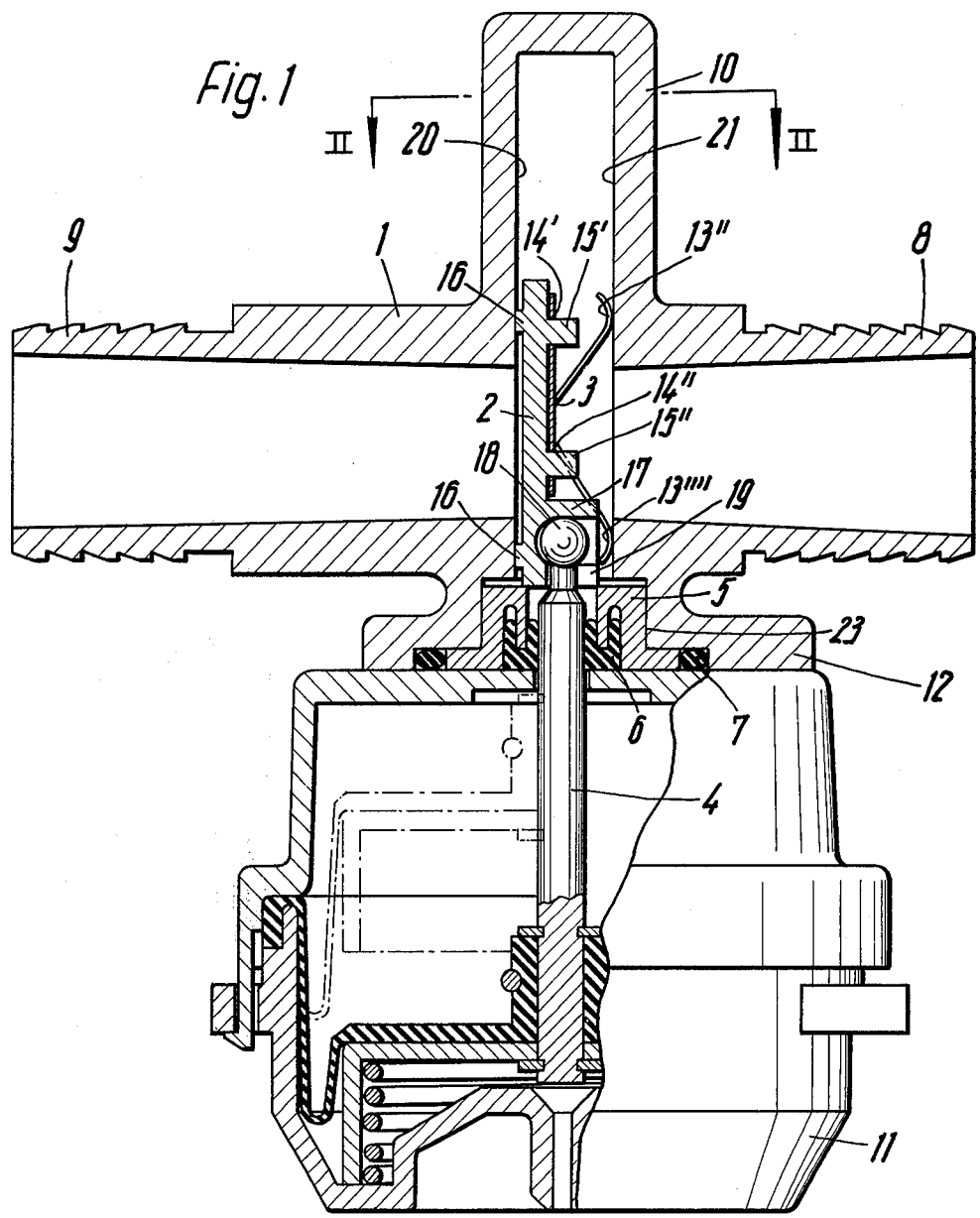
FIG. 1 is an elevation view, partially in section, of a water faucet of the invention with a flange-fastened partial-vacuum setting box.
Figure 2:
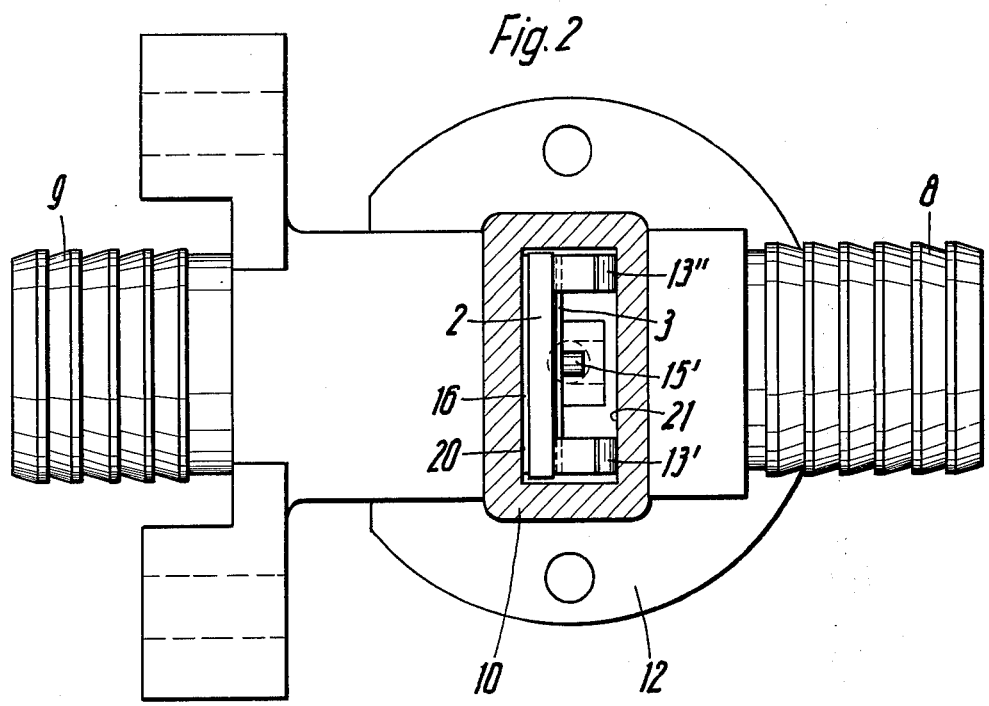
FIG. 2 is a partial sectional view through the housing along lines II—II of FIG. 1.

As shown in FIG. 1, the water faucet of the invention comprises a housing 1 with an intake nipple 8 and an exhaust nipple 9. The housing 1 includes a slider chamber 10 preferably of one piece and approximately parallelepipedic, and diametrically opposite thereto, an intake orifice 23. The housing 1 is suitably provided with a flange 12 in the vicinity of intake orifice 23. A known partial-vacuum setting box 11 of arbitrary construction is fastened to this flange 12. An actuation rod 4 is displaced traversely to the flow direction inside the housing 1 by means of such partial-pressure box 11. A slider 2, supported in the housing 1, may be displaced transversely to the direction of flow in the slider chamber 10 by means of actuation rod 4. The slider 2 thereby more or less opens the flow orifice by means of its edge close to the actuation rod 4.

Figure 3:
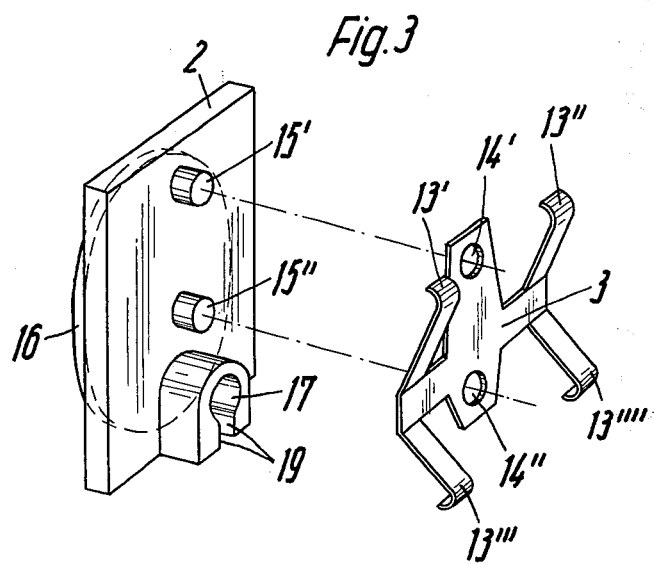
FIG. 3 is an exploded perspective view of the slider with spring component.

The design of slider 2 is especially clearly shown in FIG. 3. Such slider 2 is provided with an oval boss or projection 16 in the form of a torus or annular ring; the oval boss 16 is approximately ½mm high and 1.0 mm wide in the illustrated embodiment. The back side of slider 2 preferably is provided with two studs 15' and 15" and a ball-bearing pan 17 with extremities 19. The actuation rod 4 penetrates this ball-bearing pan 17 by means of a ball-end 18. The linkage is such that the slider 2 may be moved to and fro in the housing 1 by the actuation rod 4, while being pivotable in the transverse direction, that is, in the direction of liquid flow.

In order to achieve the desired sealing, the slider 2 is spring-loaded. This is achieved by means of an elastic spring component 3 comprising four spring legs 13', 13", 13''' and 13''''. The spring component 3 is provided with apertures 14' and 14" allowing passage therethrough of studs 15' and 15" of slider 2, so that the spring component will be supported rather loosely, yet be prevented from rotating or tilting. The pairs of spring legs 13' and 13" or 13''' and 13'''' are separated by a distance exceeding the ID of the flow orifice.

The inner surface 20 of the housing 1 facing the slider 2 is designed as the sealing surface and is located normal to the flow direction, whereas the opposite inside surface is designed as a sliding surface 21. Such surface 21 is slightly conical or sloped with respect to sealing surface 20 or to the flow direction. This taper greatly facilitates the manufacture of the housing 1 as an injection molded article, there being then the necessary draft providing feasibility of easy removal of the mold required for forming slider chamber 10.

Preferably the housing 1 and the slider 2 will be made of plastic, the housing for instance being made of a suitable hard synthetic plastic commercially available, such as glass fiber reinforced ULTRAMID AK (nylon 6/6 copolymerizate), or other nylon, or acetal, preferably glass fiber reinforced; and the slider for instance being made of a suitable elastic synthetic plastic commercially available, such as HOSTAFORM C 9020, a polyacetal resin. The selection of two differing plastics or of the differing properties of the plastics results in an especially good seal, and mostly so if the housing plastic is heat-resistant and dimensionally stable with respect to heating, while the slider plastic is elastically deformable when heated but otherwise also thermally resistant.

Figure 4:
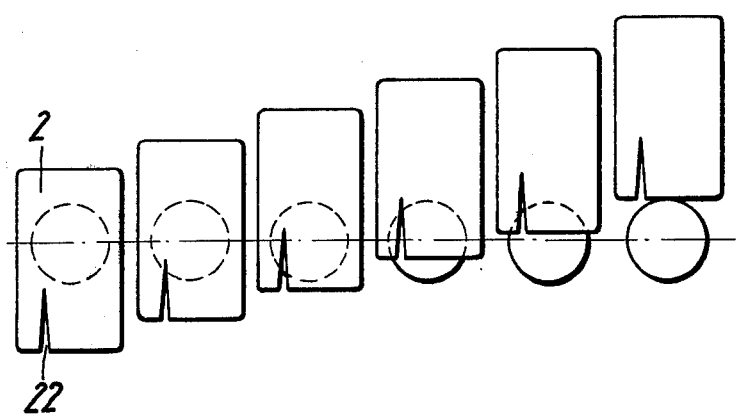
FIG. 4 is a slider with regulating slit, at various lift levels.

In a further development of the invention as illustrated in FIG. 4, the slider 2 may comprise a regulation slit 22. The latter is of wedge-shaped design and located at the actuation end of the slider. Its length is about one-third that of the slider 2. The slit furthermore is located at a fourth of the slider width. FIG. 4 shows various locations of slider 2 with respect to the flow cross-section. Regulating slit 22 will be especially applicable if slider 2 is activated by a Bowden, metal-sheathed cable or if the partial vacuum used to actuate partial-vacuum setting box 11 is modulated.

FIG. 1 shows that the intake orifice 23 is suitably sealed with respect to the housing 1. Use is made of a seal 5 seated in the orifice 23 with an O-ring 7. A U-ring 6 seals the actuation rod. High-alloyed steel is preferably used as the material for elastic spring component 3 and actuation rod 4. The latter preferably will be polished so as to be of negligible influence on the flow when the flow cross-section is opened by displacement of the slider 2 upwardly from the position shown in FIG. 1.

The invention is not restricted to the embodiment as illustrated and described. Rather, it encompasses all expert variations as well as partial or sub-combinations of the characteristics and steps described and/or represented.

I claim:

1. In a valve comprising a housing and a slider movable within said housing transversely to the direction of liquid flow through the valve, the improvement comprising:

said housing having a cooperative sealing surface on the interior thereof for said slider, a spring sliding surface opposite said cooperative sliding surface, and a sealed insert orifice at one end thereof;

an actuation rod linked to said slider by a universal or ball joint, said actuation rod extending into said housing through said sealed insert orifice;

said slider having a rectangular shape, a first face containing a toroidal sealing surface in slidable cooperation with said cooperative sealing surface, and a second face having a spring retaining surface, said slider being translational against said cooperative sealing surface in a direction normal to the direction of liquid flow; and spring means for loading said toroidal slider sealing surface against said cooperative sealing surface at the center of mass of said slider sealing surface, said spring means comprising a spring retained against rotation on said spring retaining surface and having a center portion extending across the center of said slider and four spring legs extending outwardly from said center portion and terminating in sliding portions in sliding relationship with said spring sliding surface.

2. A valve as set forth in claim 1, wherein said toroidal sealing surface is an approximately oval-shaped annular toroid.

3. A valve in accordance with claim 1, wherein said spring is provided with two apertures and said slider is provided with two complementary studs extending through said two apertures in said spring, the axes of said studs being in the direction of liquid flow through the valve, said spring seating on said studs while permitting relative movement between said spring and said slider in the flow direction.

4. A valve in accordance with claim 1, wherein a plane passing through said actuation rod and said universal or ball joint and perpendicular to the direction of liquid flow through the valve lies downstream from a plane passing through the center of said slider.

5. A valve in accordance with claim 1, wherein said housing including said cooperative sealing surface is formed of a temperature resistant and thermally dimensionally stable plastic, and said slider is formed of a different plastic which is elastically deformable when heated.

6. A valve in accordance with claim 1, wherein said housing is provided with means for mounting a partial-pressure setting box, said means comprising a flange.

7. A valve in accordance with claim 1 comprising means for actuation utilizing a bowden cable or by modulated partial pressure, said means comprising a wedge-shaped regulating slit.

8. A valve in accordance with claim 7, wherein said regulating slit is located at the fastening edge of said slider.

9. A valve in accordance with claim 8, wherein said regulating slit is located at the fastening edge at a position approximately one-fourth the width of said slider from one of the slider edges, said regulating slit being essentially parallel to said longitudinal edge of said slider and about one-third the length of said slider.

* * * * *